United States Patent [19]
Brewster

[11] B 3,927,362
[45] Dec. 16, 1975

[54] RECTIFIER CIRCUIT FOR PROVIDING SIX-PHASE RECTIFICATION OF THREE-PHASE ALTERNATING CURRENT

[75] Inventor: Roger F. Brewster, Santa Barbara, Calif.

[73] Assignee: General Motors Corporation, Detroit, Mich.

[22] Filed: Oct. 25, 1973

[21] Appl. No.: 409,657

[44] Published under the Trial Voluntary Protest Program on January 28, 1975 as document no. B 409,657.

[52] U.S. Cl. .................................. 321/5; 321/9 R
[51] Int. Cl.² ........................................ H02M 7/155
[58] Field of Search ............................. 321/9 R, 5

[56] References Cited
UNITED STATES PATENTS

| | | | |
|---|---|---|---|
| 1,712,502 | 5/1929 | Jonas | 321/5 |
| 1,712,569 | 5/1929 | Kubler | 321/5 |
| 3,308,368 | 3/1967 | Schmidt, Jr. | 321/9 R |
| 3,707,665 | 12/1972 | Gyugyi | 321/69 R X |
| 3,707,667 | 12/1972 | Gyugyi | 321/5 |
| 3,772,601 | 11/1973 | Smith | 321/5 X |

*Primary Examiner*—R. N. Envall, Jr.
*Attorney, Agent, or Firm*—Howard N. Conkey

[57] ABSTRACT

A circuit is provided to convert a three-phase alternating wave form to a six-phase rectified wave form. Three groups of three controlled bilateral switches are provided each of which selectively and sequentially couples each phase of the three-phase wave form in 60° segments to a respective transformer, the signal coupled to each transformer having a frequency that is three times the frequency of the three-phase alternating signal. Each of the three groups of controlled switches couples a respective one of the phases of the three-phase alternating wave form to its respective transformer at any given instant of time. The positive signals at the outputs of the transformers are combined to provide a positive six-phase rectified wave form and the negative signals at the outputs of the transformers are combined to provide a negative six-phase rectified wave form.

4 Claims, 4 Drawing Figures

RECTIFIER CIRCUIT FOR PROVIDING SIX-PHASE RECTIFICATION OF THREE-PHASE ALTERNATING CURRENT

This invention relates to a rectifier for converting three-phase alternating wave forms to six-phase rectified wave forms.

Typical rectifying units for converting three-phase alternating currents and voltages to direct currents and voltages are large and heavy devices. The size and weight is not so much due to the rectifier elements and their heat sinks but more to the input transformers which are used in such equipment which operate at the basic power frequency. These input transformers serve the functions of providing isolation and voltage transformation between input and output.

It is one object of this invention to provide a rectifier circuit which provides transformation of three-phase AC power to six-phase rectified DC power having transformers operating at three times the input three-phase AC power frequency.

It is another object of this invention to provide for a rectifier circuit in which selected segments of each wave form of a three-phase alternating wave form are applied across a plurality of transformers at a frequency equal to three times the frequency of the three-phase wave form and in which the outputs of the transformers are summed so as to provide six-phase rectified signals.

The objects of this invention are accomplished by providing three phase selector means each of which couples each of the phases of a three-phase signal to its output in 60 electrical degree segments. Each of the phase selector means couples a respective one of the phases of the three-phase signal to its output at any given instant of time. The positive portions of the wave forms coupled to the outputs of the phase selector means are summed to provide a positive six-phase rectified signal and the negative segments of the signals coupled to the outputs of the phase selector means are summed to provide a negative six-phase rectified signal.

The invention may be best understood by reference to the following description of a preferred embodiment of the invention and the drawings in which.

Figure 1:
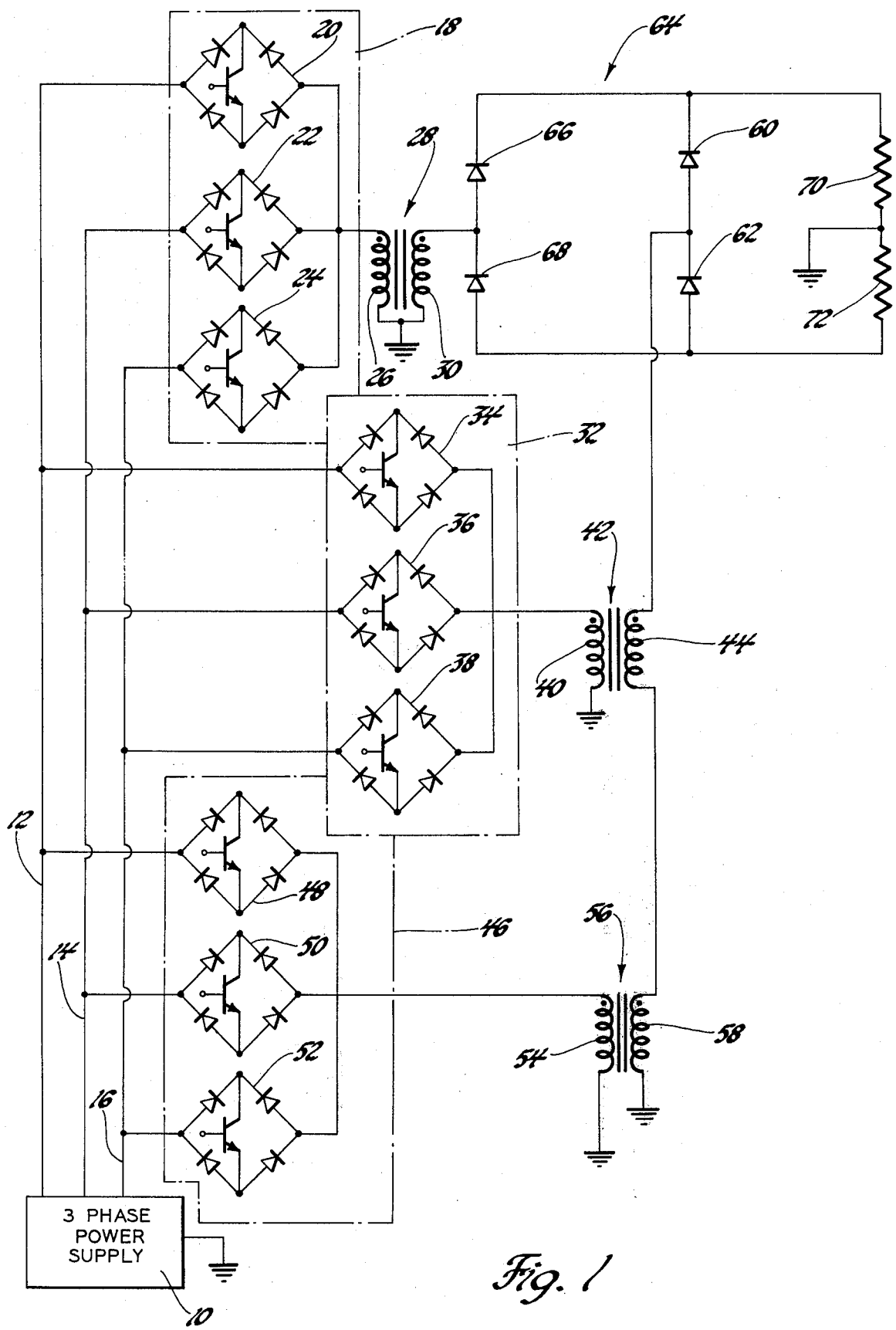
FIG. 1 is an electrical schematic of the rectifier circuit of this invention.
Figure 2:
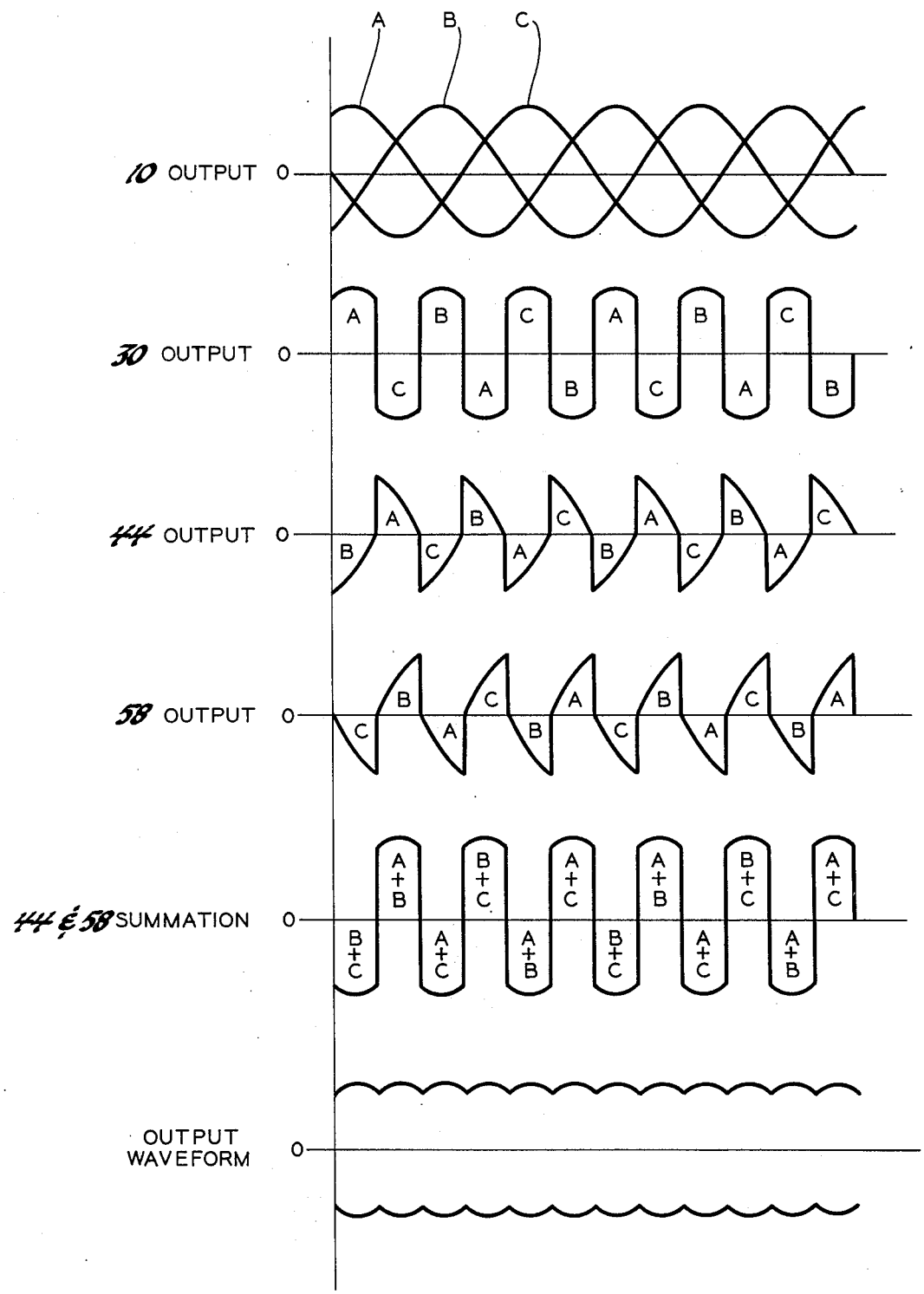
FIG. 2 is a graph of input and output signal wave forms in the circuit of FIG. 1.

Referring to FIGS. 1 and 2, a grounded three-phase power supply 10 generates a three-phase alternating electrical wave form comprised of phase signals A, B and C displaced from one another by 120 electrical degrees. These phase signals A, B and C are applied to output lines 12, 14 and 16 respectively of the three-phase power supply 10. The phase signals A, B and C are illustrated in FIG. 2 in which the zero levels shown are equivalent to ground potential.

A phase selector 18 includes three switches 20, 22 and 24. The switches 20, 22 and 24 are each provided by a bilateral electronic switch comprised of an NPN transistor and two sets of series coupled diodes in parallel therewith, the cathode of one diode in each set being coupled to the collector of the transistor and the anode of the remaining diode in each set being coupled to the emitter of the transistor. The input to each of the switches 20, 22 and 24 is provided between the diodes of one of the sets of diodes and the output of each of the switches 20, 22 and 24 is provided between the diodes of the other set of diodes. Each of the switches 20, 22 and 24 is biased into conduction to couple positive or negative signals at its input to its output by a control signal applied to the base of the transistor therein. The phase signals A, B and C are respectively coupled to the inputs of the switches 20, 22 and 24 through the output lines 12, 14 and 16. The outputs of the switches 20, 22 and 24 are coupled to one another and then to ground through the primary winding 26 of a transformer 28 having a secondary winding 30.

Upon the application of a control signal to one of the switches 20, 22 or 24, the respective phase signal A, B or C which is supplied thereto is coupled across the primary winding 26. The waveform induced in the secondary winding 30 is substantially identical in form to the output of the phase selector 18 across the primary winding 26 and has an amplitude dependent upon the turns ratio of the primary and secondary windings 26 and 30.

The switches 20, 22 and 24 are controlled so as to sequentially couple each of the phase signals A, B and C across the primary winding 26 in 60 electrical degree segments beginning from 60 electrical degrees after each zero level crossover of said phase signal. The resulting signal induced in the secondary winding 30 of the transformer 28 takes the form as shown in FIG. 2. As illustrated therein, the wave form induced in the secondary winding 30 takes the form of alternating positive and negative pulses, each resulting from the phase signal A, B or C as indicated and each having a width equal to 60 electrical degrees of the input phase signals A, B and C. This alternating signal has a frequency which is three times the frequency of the phase signals A, B and C from the three-phase power supply 10.

A phase selector 32 is comprised of three switches 34, 36 and 38 which are identical to the switches 20, 22 and 24 in the phase selector 18. The phase signals A, B and C are coupled to respective inputs of the switches 34, 36 and 38 through the output lines 12, 14 and 16. The outputs of the switches 34, 36 and 38 are coupled to one another and then to ground through the primary winding 40 of a transformer 42 having a secondary winding 44. Upon the application of a control signal to one of the switches 34, 36 or 38, the respective phase signal A, B or C which is supplied thereto is coupled across the primary winding 40 of the transformer 42. The wave form induced in the secondary winding 44 is substantially identical in form to the output of the phase selector 32 across the primary winding 40 and has an amplitude dependent on the turns ratio of the primary and secondary windings 40 and 44. Control signals are applied to the switches 34, 36 and 38 so as to sequentially couple each of the phase signals A, B and C across the primary winding 40 in 60 electrical degree segments beginning from 120 electrical degrees after each zero level crossover of said phase signal. The resulting signal induced in the secondary winding 44 takes the form as shown in FIG. 2. As illustrated therein, the wave form induced in the secondary winding 44 takes the form of alternating positive and negative pulses, each resulting from the phase signal A, B or C as indicated and each having a width equal to 60 electrical degrees of the input phase signals A, B and C. This alternating signal has a frequency which is three times the frequency of the phase signals A, B and C from the three phase power supply 10.

A phase selector 46 is comprised of three switches 48, 50 and 52 which are identical to the switches 20, 22 and 24 in the phase selector 18. The phase signals A, B and C are coupled to the inputs respectively of the switches 48, 50 and 52 through the output lines 12, 14 and 16. The outputs of the switches 48, 50 and 52 are coupled to one another and then to ground through a primary winding 54 of a transformer 56 having a secondary winding 58. Upon the application of a control signal to one of the switches 48, 50 or 52, the respective phase signal A, B or C which is supplied thereto is coupled across the primary winding 54 of the transformer 56. The wave form induced in the secondary winding 58 is substantially identical in form to the output of the phase selector 46 across the primary winding 54 and has an amplitude dependent on the turns ratio of the primary and secondary windings 54 and 58. Control signals are applied to the switches 48, 50 and 52 so as to sequentially couple each of the phase signals A, B and C across the primary winding 54 in 60 electrical degree segments beginning from each zero level crossover of said phase signal. The resulting wave form induced in the secondary winding takes the form as shown in FIG. 2. As illustrated therein, the voltage induced in the secondary winding 58 takes the form of alternating positive and negative pulses, each resulting from the phase signal A, B or C as indicated and each having a width equal to 60 electrical degrees of the phase signals A, B and C. This alternating signal has a frequency equal to three times the frequency of the phase signals A, B and C from the three phase power supply 10.

The control signals applied to the switches 20, 22, 24, 34, 36, 38, 48, 50 and 52 are such that at any instant in time, each of the phase signals A, B and C is coupled across a respective one of the primary windings 26, 40 and 54 of the transformers 28, 42 and 56.

The secondary windings 58 and 44 of the transformers 56 and 42 are series coupled. The remaining side of the secondary winding 58 is grounded. The remaining side of the secondary winding 44 is coupled between two diodes 60 and 62 of a bridge rectifier 64. One side of the secondary winding 30 is grounded and the remaining side thereof is coupled between two diodes 66 and 68 of the bridge rectifier 64.

The output of the bridge rectifier 64 is coupled across a load comprised of an impedance 70 and an impedance 72 series coupled, the junction therebetween being grounded.

The voltage wave forms induced in the secondary windings 44 and 58 are summed by nature of their series connection with the resulting wave form being identical to the wave form induced in the secondary winding 30 shifted by 180 degrees as illustrated in FIG. 2. The positive portions of the voltage outputs from the secondary winding 30 and the series coupled secondary windings 44 and 58 are sequentially passed through the diodes 60 and 66 and are applied across the output impedance 70. The negative portions of the voltage outputs from the secondary winding 30 and the series coupled secondary windings 44 and 58 are sequentially passed through the diodes 62 and 68 and are applied across the output impedance 72. The wave form across the outputs of the bridge rectifier 64 is a six-phase unidirectional wave form. The resulting output wave form across the impedances 70 and 72 is illustrated in FIG. 2 and is comprised of six-phase positive and negative rectified signals.

Figure 3:
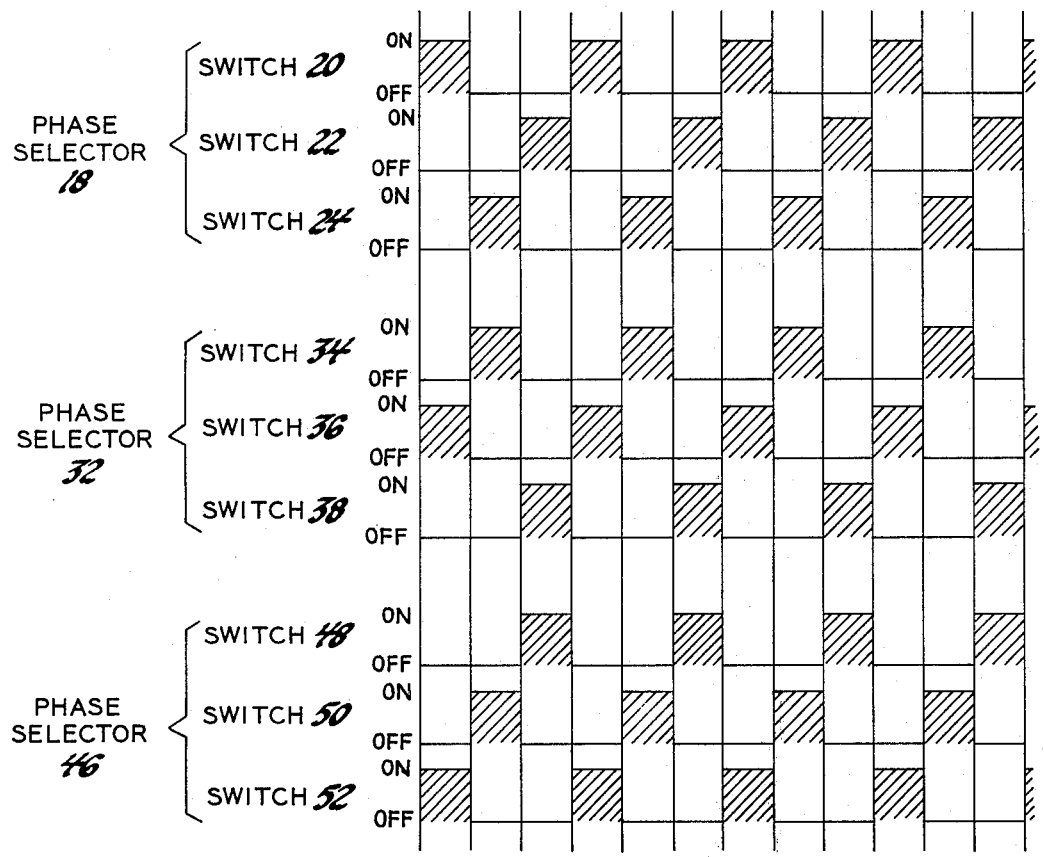
FIG. 3 is a timing diagram for the circuit of FIG. 1.

FIG. 3 presents a timing diagram which defines the operation of the switches in the phase selectors 18, 32 and 46 over the interval of the wave forms in FIG. 2. The cross-hatched areas in FIG. 3 represent the 60 electrical degree time periods during which the respective switches are gated conductive to generate the wave forms illustrated in FIG. 2.

Figure 4:
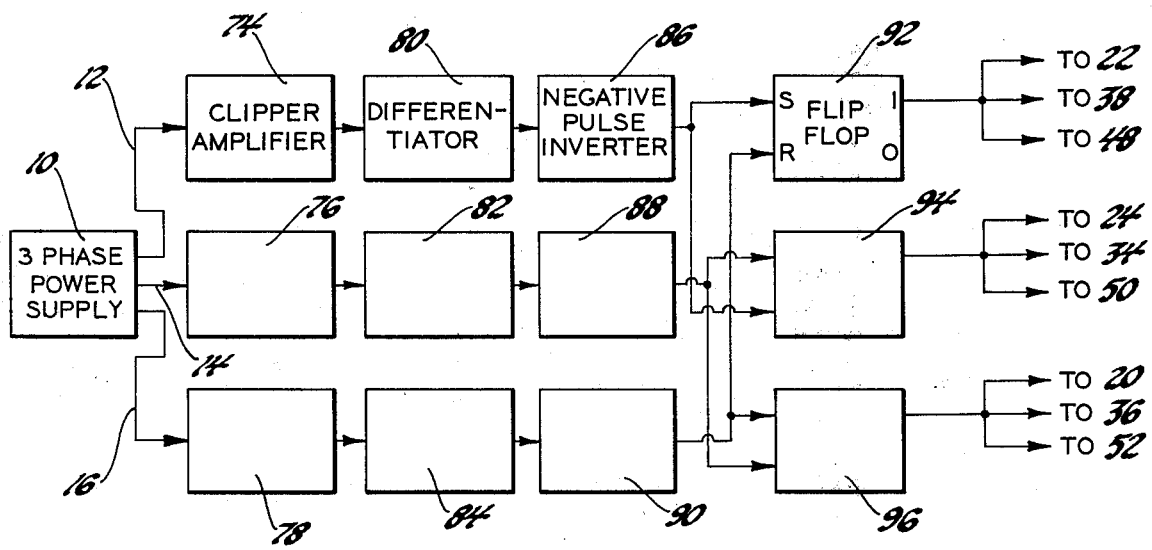
FIG. 4 is a block diagram of a timing control apparatus for the present invention.

FIG. 4 illustrates a timing generator for controlling the switches in the phase selectors 18, 32 and 46 in accordance with the timing diagram of FIG. 3. As seen in FIG. 4 phase signals A, B and C are coupled to clipper amplifiers 74, 76 and 78 respectively through lines 12, 14 and 16. The clipper amplifiers 74, 76 and 78 generate alternating substantially square wave forms which are coupled to respective differentiators 80, 82 and 84. The outputs of the differentiators 80, 82 and 84 are alternating positive and negative pulses which are coupled to respective negative pulse inverters 86, 88 and 90. The output of the negative pulse inverter 86 is a series of pulses each of which corresponds to a zero crossover of the phase signal A. In like manner, the outputs of the negative pulse inverters 88 and 90 are a series of pulses each of which corresponds to zero crossovers of respective phase signals B and C. The output pulses from the negative pulse inverter 86 are coupled to the set input of a flip flop 92 and the reset input of a flip flop 94. The pulse outputs from the negative pulse inverter 88 are coupled to the set input of the flip flop 94 and the reset input of a flip flop 96. The pulses from the negative pulse inverter 90 are coupled to the reset input of the flip flop 92 and to the set input of the flip flop 96. The "1" output of each of the flip flops 92, 94 and 96 is a positive voltage when said flip flop is set and zero or ground when reset.

The "1" output of the flip flop 92 constitutes the control signals supplied to the switches 22, 38 and 48, the "1" output of the flip flop 94 constitutes the control pulses supplied to the switches 24, 34 and 50, and the "1" output of the flip flop 96 constitutes the control pulses supplied to the switches 20, 36 and 52. These pulses coincide with the timing diagram of FIG. 3 and operate to control the phase selectors 18, 32 and 46 to generate the wave forms illustrated in FIG. 2.

As can be seen from the foregoing, the transformers 28, 42 and 56 are all operated at a frequency three times the frequency of the phase signals A, B and C thereby minimizing the required size and weight thereof. In addition, these transformers provide for isolation and voltage transformation. Further, voltage regulation can be achieved by varying the conduction time of the switches in the phase selectors 18, 32 and 46.

If voltage isolation or transformation is not a requirement, the phase selector 18, transformer 28, and the diodes 66 and 68 can be replaced by a three phase diode bridge rectifier whose inputs are comprised of the phase signals A, B and C and whose output is coupled across the diodes 60 and 62. Phase selectors 18, 32 and 46 could also be comprised of controlled rectifiers with additional circuitry to provide for commutation thereof.

The detailed description of the preferred embodiment of the invention for the purpose of explaining the principles thereof is not to be considered as limiting or restricting the invention, since many modifications may be made by the exercise of skill in the art without departing from the scope of the invention.

It is claimed:

1. A rectifier circuit for converting a three-phase alternating signal output from a three-phase supply to a six-phase rectified unidirectional signal comprising: first, second and third phase selector means coupled to the three-phase supply, each of the phase selector means sequentially coupling each phase of the three-phase alternating signal to its output in 60 electrical degree segments, each phase of the three-phase alternating signal being coupled to the output of a respective one of the phase selector means at any instant in time and means coupled to the outputs of the first, second and third phase selector means for combining the positive 60 electrical degree segments coupled to the outputs of the first, second and third phase selector means and combining the negative 60 electrical degree segments coupled to the outputs of the first, second and third phase selector means, whereby the combined positive and negative segments comprise a six-phase unidirectional signal.

2. A rectifier circuit for converting a three-phase alternating signal output from a three-phase supply to a six-phase rectified unidirectional signal comprising: first, second and third phase selector means coupled to the three-phase supply, each of the phase selector means sequentially coupling each phase of the three-phase alternating signal to its output in 60 electrical degree segments, each phase of the three-phase alternating signal being coupled to the output of a respective one of the phase selector means at any instant in time; first, second and third transformers, each transformer having a primary and secondary winding; means coupling each of the first, second and third phase selector means across a respective primary winding of the first, second and third transformers; and means for combining the positive signals induced in the secondary windings of the first, second and third transformers and combining the negative signals induced in the secondary windings of the first, second and third transformers, whereby the combined positive and negative signals comprise a six-phase rectified unidirectional signal.

3. A rectifier circuit for converting a three-phase alternating signal output from a three-phase supply to a six-phase rectified unidirectional signal comprising: first, second and third phase selector means, each phase selector means having first, second and third bilateral electronic switches, each of said switches being effective when biased into conduction to couple the input thereof to the output of the respective phase selector means; means for coupling the first, second and third phases of the three-phase alternating signal respectively to the inputs of the first, second and third bilateral electronic switches of each of the phase selector means; means for sequentially biasing the bilateral electronic switches in each phase selector means into conduction for 60 electrical degrees of the three-phase signal, each of the phases of the three-phase signal being coupled to the output of a respective phase selector at any instant of time; means for combining the positive portions of the three-phase signals coupled to the outputs of the first, second and third phase selector means and combining the negative portions of the three-phase signals coupled to the outputs of the first, second and third phase selector means; first and second output terminals; and means for coupling the combined positive and negative signals respectively to the first and second output terminals, whereby the signal across the first and second output terminals comprise a six-phase rectified unidirectional signal.

4. A rectifier circuit for converting a three-phase alternating signal output from a three-phase supply to a six-phase rectified unidirectional signal comprising: first phase selector means coupled to the three-phase supply for coupling to its output each 60 electrical degree segment of each phase of the three-phase alternating signal beginning at 60 electrical degrees after each zero level crossover of said phase; second phase selector means coupled to the three-phase supply for coupling to its output each 60 electrical degree segment of each phase of the three-phase alternating signal beginning at 120 electrical degrees after each zero level crossover of said phase; third phase selector means coupled to the three-phase supply for coupling to its output each 60 electrical degree segment of each phase of the three-phase alternating signal beginning at each zero level crossover of said phase; first, second and third transformers, each transformer having a primary and secondary winding; means coupling the output of each of the first, second and third phase selector means across a respective primary winding of the first, second and third transformers; means for series coupling the secondary windings of the second and third transformers so as to combine the signals induced therein; a diode bridge having a pair of input terminals and a pair of output terminals; means for coupling the signal induced in the secondary winding of the first transformer to one input of said diode bridge; means for coupling the combined signals induced in the secondary windings of the second and third transformers to the second input of said diode bridge, whereby the signal across the output terminals of the diode bridge comprise a six-phase rectified unidirectional signal.

* * * * *